United States Patent
Hamada

(10) Patent No.: US 9,409,746 B2
(45) Date of Patent: Aug. 9, 2016

(54) FLAT CABLE WINDING DEVICE

(71) Applicant: YAZAKI CORPORATION, Tokyo (JP)

(72) Inventor: Ryo Hamada, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 150 days.

(21) Appl. No.: 14/375,058

(22) PCT Filed: Feb. 13, 2013

(86) PCT No.: PCT/JP2013/053339
§ 371 (c)(1),
(2) Date: Jul. 28, 2014

(87) PCT Pub. No.: WO2013/122077
PCT Pub. Date: Aug. 22, 2013

(65) Prior Publication Data
US 2015/0001327 A1    Jan. 1, 2015

(30) Foreign Application Priority Data
Feb. 16, 2012 (JP) .................... 2012-031397

(51) Int. Cl.
*B65H 75/48* (2006.01)
*B65H 75/44* (2006.01)
*B60R 16/027* (2006.01)
*H02G 11/02* (2006.01)

(52) U.S. Cl.
CPC .............. *B65H 75/44* (2013.01); *B60R 16/027* (2013.01); *B65H 75/4455* (2013.01); *B65H 75/4471* (2013.01); *B65H 75/48* (2013.01); *H02G 11/02* (2013.01); *B65H 2701/37* (2013.01)

(58) Field of Classification Search
CPC ........... B65H 75/4434; B65H 75/4471; H01R 35/025; H01R 2201/26
See application file for complete search history.

(56) References Cited

U.S. PATENT DOCUMENTS

| | | | | |
|---|---|---|---|---|
| 5,865,634 | A * | 2/1999 | Best ................ | H01R 35/025 439/15 |
| 2013/0248632 | A1* | 9/2013 | Hamada ............ | H01R 35/025 242/371 |
| 2014/0353415 | A1* | 12/2014 | Katsuramaki ...... | H02G 11/02 242/371 |

FOREIGN PATENT DOCUMENTS

| | | | |
|---|---|---|---|
| JP | 4-310445 | A | 11/1992 |
| JP | 5-326093 | A | 12/1993 |
| JP | 11-116145 | A * | 4/1999 |
| JP | 2004-95209 | A | 3/2004 |
| JP | 2004-328985 | A | 11/2004 |
| JP | 2013-151335 | A | 8/2013 |

OTHER PUBLICATIONS

The extended European search report for the related European Patent Application No. 13749897.8 dated Sep. 28, 2015.

* cited by examiner

*Primary Examiner* — Sang Kim
(74) *Attorney, Agent, or Firm* — Kenealy Vaidya LLP

(57) ABSTRACT

Provided is a flat cable winding device which can prevent slack of a flat cable and achieve smooth winding and leading out of the flat cable. A flat cable winging device includes a rotating table, a plurality of rollers, a central shaft which rotatably and pivotally supports the rotating table, an inner winding portion formed by the flat cable wound around the central shaft, and an outer winding portion formed by the flat cable wound around outer circumferences of the plurality of rollers. By forming the outer winding portion, the plurality of rollers is pushed toward the inner winding portion, preventing slack of the inner winding portion when leading out the flat cable.

1 Claim, 5 Drawing Sheets

FLAT CABLE WINDING DEVICE

TECHNICAL FIELD

The present invention relates to a flat cable winding device for winding one end side of a flat cable and leading out another end side of the flat cable.

BACKGROUND ART

For example, an automobile and such employs a sliding seat, a slide door or the like arranged slidable with respect to a vehicle. The sliding seat is mounted with a seat sensor for detecting whether or not a passenger is seated and an electronic device such as a seat belt sensor for detecting whether or not a seat belt is fastened. The slide door is mounted with a drive motor for opening and closing a door window and an electronic device such as a door courtesy lamp for lighting one's feet when the door is opened. For this reason, the vehicle having a slide body such as a sliding seat or a slide door is provided with various electric wire wiring devices for wiring an electric wire from a vehicle body to the slide body or power supply devices, in order to connect an electronic device provided at the slide body side and an electronic device such as a control device provided at the vehicle body side.

In such electric wire wiring device, the electric wire (e.g., a flat cable or a flat harness) connecting the electronic device of the slide body side and the electronic device of the vehicle body side will have an extra length portion which is formed to the electric wire with the sliding of the slide body. Thus, the winding device is used for winding such extra length portion of the electric wire to prevent the electric wire from interfering with the slide body and such (for example, refer to Patent Literature 1). As shown in FIG. 5, a conventional flat cable winding device 00 disclosed in Patent Literature 1 is configured to wind up one end side of a flat cable C and lead out an another end side of the flat cable C, and includes a case 101 which is substantially cylindrical in entire shape, an inner annular wall 102 provided in the case 101 and retaining the one end side of the flat cable C, a rotor 103 configured to be guided by the inner annular wall 102 and rotatably arranged, and a coil spring 104 configured to bias the rotor 103 in a winding direction R of the flat cable C. The rotor 103 is provided with a plurality of rollers 105 arranged along a circumferential direction of the rotor 103.

The winding device 100 is configured such that, the one end side of the flat cable C introduced into the case 101 is reversed by one of the plurality of rollers 105 and retained in the inner annular wall 102, and the another end side of the flat cable C is led out to the outside of the case 101. Furthermore, the winding device 100 is configured to wind up the flat cable C by rotating the rotor 103 in the winding direction R by the biasing force of the coil spring 104, thereby winding the flat cable C around the inner annular wall 102 and around outer circumferences of the plurality of rollers 105. Meanwhile, when the another end side of the flat cable C is pulled by the sliding of the slide body, the rotor 103 is rotated in an opposite direction of the winding direction R, and the flat cable C wound around the inner annular wall 102 and the plurality of rollers 105 is unwound and led to the outside of the case 101.

CITATION LIST

Patent Literature

Patent Literature 1: Japan Patent Application Publication No. 2004-328985

SUMMARY OF INVENTION

Technical Problem

However, the conventional winding device such as the one disclosed in Patent Literature 1 has a drawback that, when leading out the flat cable C, the flat cable C that has been wound around the inner annular wall 102 is slackened, and the slackened flat cable C could interfere with the rollers 105. Specifically, the slack of the flat cable C around the inner annular wall 102 is produced from a wound-up state shown in FIG. 6A in which the flat cable C is wound around the inner annular wall 102 and around the outer circumferences of the plurality of rollers 105 for a plurality of turns (e.g., three turns), respectively, to a state shown in FIG. 6B in which the rotor 103 is rotated for one rotation in the opposite direction of the winding direction R, and further to a state shown in FIG. 6C in which the rotor 103 is rotated for two rotations. Such slack is caused by the flat cable C unwound from the inner annular wall 102 being not delivered toward the rollers 105 due to the friction resistance induced in the flat cable C wound in an overlapping fashion around the outer circumferences of the plurality of rollers 105 and the friction resistance between the flat cable C and the rollers 105, for example. It is difficult to completely remove such slack of the flat cable C due to the structure of the winding device. Also, when the slackened flat cable C interferes with the roller 105 and such, the rotation of the rotor 103 is impeded and thus the winding and leading out of the flat cable C cannot be achieved smoothly.

Therefore, an object of the present invention is to provide a flat cable winding device which can prevent slack of a flat cable and achieve smooth winding and leading out of the flat cable.

Solution to Problem

One aspect of the present invention provides a flat cable winding device for winding one end side of a flat cable and leading out another end side of the flat cable, the flat cable winding device including: a case having an insertion hole through which the flat cable is inserted; a central shaft provided in the case and retaining the one end side of the flat cable; a rotating body configured to rotate about the central shaft; and a biasing element configured to bias the rotating body in a winding direction of the flat cable, wherein the rotating body includes a plurality of rollers arranged along a circumferential direction of the rotating body and configured to slide in a radial direction of the rotating body, wherein at least one of the plurality of rollers is a reversing roller configured to reverse the flat cable entered from the insertion hole of the case toward the central shaft, and wherein, when the rotating body which is biased by the biasing element is rotated in the winding direction and the flat cable is wound up so as to form an inner winding portion formed by the flat cable wound around the central shaft and an outer winding portion formed by the flat cable wound around outer circumferences of the plurality of rollers, the plurality of rollers is pushed toward the inner winding portion by the outer winding portion.

According to the above described feature, the one end side of the flat cable is retained and the another end side of the flat cable is reversed by the reversing roller and led out to the outside of the case. In this state, when the rotating body is rotated in the winding direction by the restoring force of the biasing element, the flat cable is wound around the outer circumference of the central shaft and the outer circumferences of the plurality of rollers of the rotating body, thereby forming the inner winding portion formed by the flat cable wound along the outer circumference of the central shaft and forming the outer winding portion formed by the flat cable wound along the outer circumferences of the plurality of rollers, and by which the flat cable is wound up. At this time, the reversing roller is slid toward the central shaft by the winding force of the outer winding portion and pushed toward the inner winding portion. As the flat cable is wound up, a number of windings of the flat cable to the central shaft is increased, and a diameter dimension of the inner winding portion is increased. Thus, the plurality of rollers is pushed back radially-outward of the rotating body by the inner winding portion and is slid radially-outward of the rotating body. The reversing roller rotates (rotates on its axis) while being pushed toward the inner winding portion and delivers the flat cable taken up form the outer circumferences of the plurality of rollers toward the central shaft. When leading out the flat cable from such wound state, the rotating body is rotated in the opposite direction of the winding direction, and the outer winding portion is unwound led out to the outside of the case, while the inner winding portion is unwound and the flat cable is delivered to the outer winding portion via the reversing roller and the flat cable is led out. As the flat cable is led out, the number of the windings of the flat cable to the central shaft is decreased, and the diameter dimension of the inner winding portion is reduced. Thus, the reversing roller is pushed toward the central shaft by the winding force of the outer winding portion and is slid toward the central shaft. At this time, the reversing roller rotates (rotates on its axis) while being pushed toward the inner winding portion by the outer winding portion, and the flat cable unwound from the central shaft is delivered to the outer circumferences of the plurality of rollers.

Advantageous Effect of Invention

According to the one aspect of the present invention, the reversing roller is slidable in the radial direction of the rotating body, and the reversing roller is pushed toward the inner winding portion by the outer winding portion. Thus, when leading out the flat cable, the reversing roller, while being pushed toward the inner winding portion, is rotated with involving the flat cable, and the flat cable unwound from the central shaft is forcibly delivered toward the reversing roller. Thus, the chance of producing the slack of the flat cable at around the central shaft (at the inner winding portion) is reduced, preventing the interference of the slackened flat cable with the plurality of rollers (the reversing roller). As a result, the rotation of the rotating body is not impeded, achieving smooth winding and leading out of the flat cable.

BRIEF DESCRIPTION OF DRAWINGS

FIGS. 4A and 4B are plan views illustrating an operation of the flat cable winding device shown in FIG. 1, in which FIG. 4A shows how a flat cable is led out, and FIG. 4B shows how the flat cable is wound up;

DESCRIPTION OF EMBODIMENTS

In the following, a flat cable winding device according to one embodiment of the present invention is explained in reference to FIGS. 1 through 4B. A flat cable winding device 1 is configured to wind up a flat cable 2 wired between a vehicle and a sliding seat slidably provided to a floor of the vehicle, for example. One end of the flat cable 2 is connected to a connector and such provided at the floor side, and another end of the flat cable 2 guided along a slide rail is connected to a connector and such provided at the sliding seat side.

The flat cable 2 is formed into a thin band plate-like shape having flexibility, and includes a plurality of parallely-arranged core wires and an insulating cover covering the respective core wires. The core wire is formed by a plurality of twisted conducting wires, and the cover portion is made of synthetic resin. This embodiment shows an example of using the flat cable 2 having the plurality of parallely-arranged core wires; however, the flat cable may have any cross-sectional shape, and the configuration of the core wire and the insulating cover may be selected arbitrarily.

Figure 1:
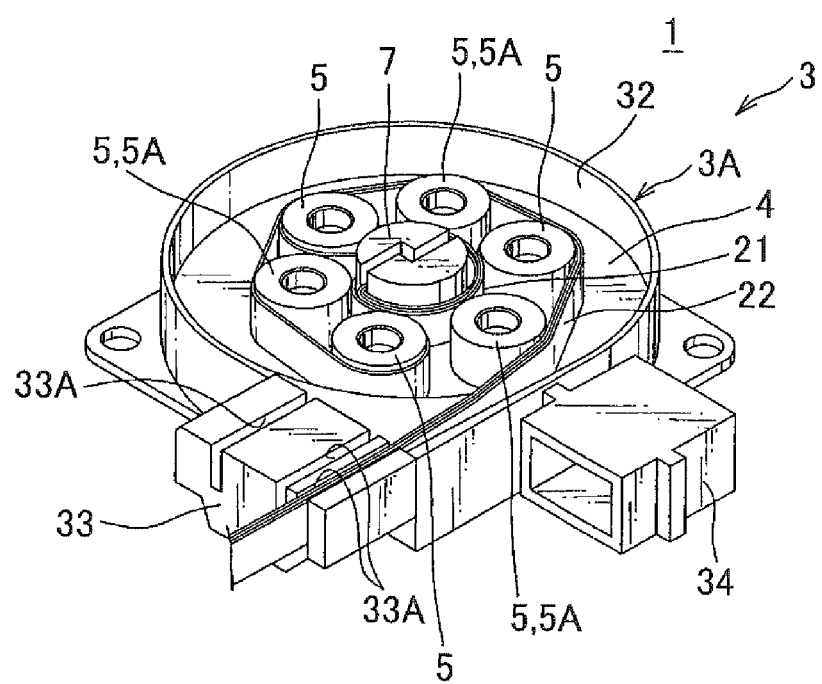
FIG. 1 is a perspective view of one embodiment of a flat cable winding device according to the present invention.
Figure 2:
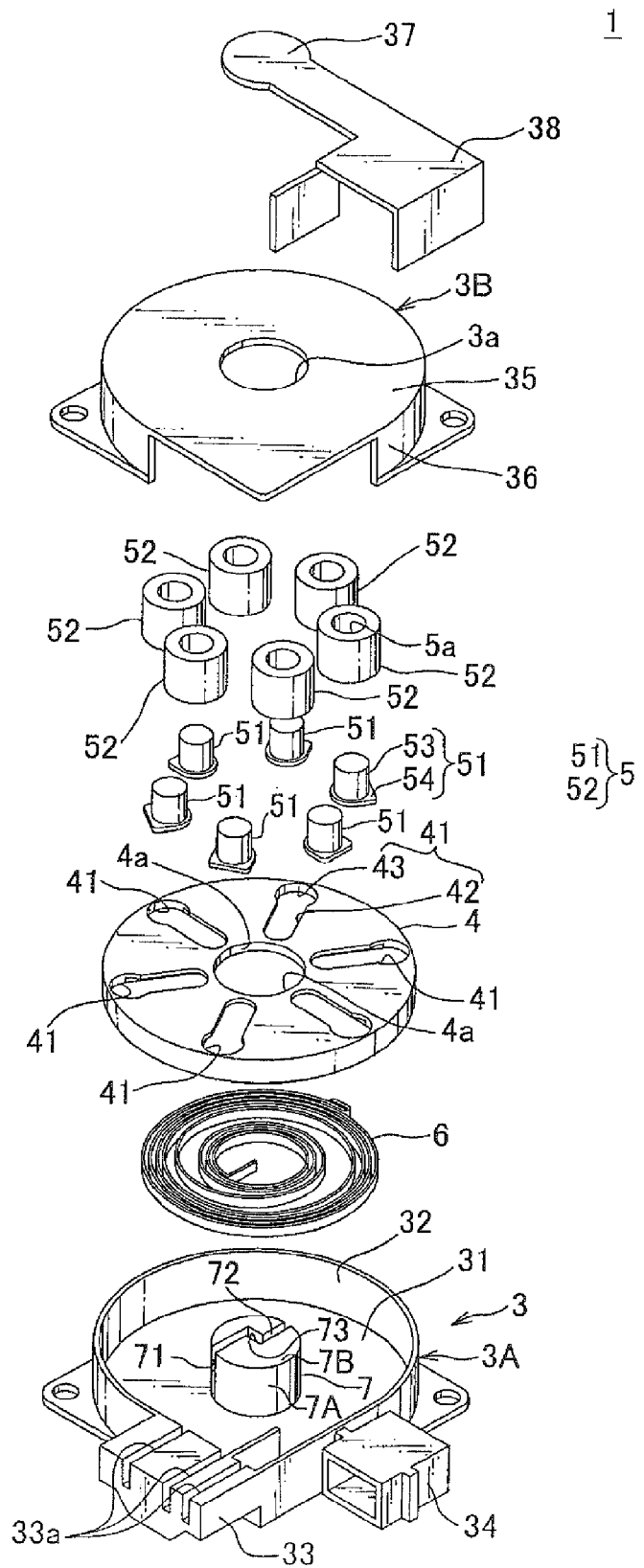
FIG. 2 is an exploded perspective view of the flat cable winding device shown in FIG. 1.

As shown in FIGS. 1 and 2, the flat cable winding device 1 includes a case 3 housing the wound flat cable 2, a rotating table 4 as a rotating body rotatably provided in the case 3, a plurality of (six, in this embodiment) rollers 5 rotatably supported on the rotating table 4, and a spiral spring 6 (shown in FIG. 2) as a biasing element configured to bias the rotating table 4 in a winding direction of the flat cable 2. The case 3 includes a lower case 3A housing the rotating table 4 and the spiral spring 6, and an upper case 3B (shown in FIG. 2) configured to cover an upper face 7B of the lower case 3A so as to close the case 3 in a hollow fashion. A central shaft 7 which rotatably and pivotally supports the rotating table 4 is vertically arranged at a substantially center of the lower case 3A.

As shown in FIG. 2, the lower case 3A is horizontally disposed on the floor of the vehicle, and includes a bottom portion 31 opposed to the floor, a peripheral wall 32 vertically arranged in a substantially cylindrical shape along an outer periphery of the bottom portion 31, a cable lead out portion 33 for leading out the another end side of the flat cable 2 to the outside, and a cable protection portion 34 for protecting the one end side of the flat cable 2 drawn out from the case 3. The upper case 3B has a circular disc-like shape in an entire shape, and includes, at its center, a top face portion 35 having an insertion hole 3a through which the flat cable 2 is inserted, a hanging wall 36 hanging down in a substantially cylindrical fashion along an outer periphery of the top face portion 35 and arranged to overlap with the peripheral wall 32 of the lower case 3A, a cable guide portion 37 guiding the one end side of the flat cable 2 from the central shaft 7 to the cable protection portion 34, and a cover portion 38 covering an upper portion of the cable protection portion 34.

As shown in FIG. 2, the central shaft 7 is vertically arranged at an internal face of the bottom portion 31 in the lower case 3A and is substantially columnar in entire shape, such that the rotating table 4 is rotatably supported by a circumferential face 7A of the central shaft 7. The central shaft 7 includes a slit 71 formed by being cut from a circumference face 7A toward a center and opening to the upper face 7B, a locking groove 72 formed by being cut from an opposite side of the slit 71 and opening to the upper face 7B, and a communication groove 73 communicating the slit 71 and the locking groove 72, which together form a crank shape in planar view. The slit 71 locks the one end side of the flat cable 2 by passing the one end side of the flat cable 2 therethrough. The one end side of the flat cable 2 passed thorugh the slit 71 is passed through the communication groove 73 and bent, and then it is led out from the upper face 7B of the central shaft 7 and guided to the cable guide portion 37 of the upper case 3B. Then, the one end side of the flat cable 2 is guided from the cable guide portion 37 to the cable protection portion 34 of the lower case 3A, led out to the outside of the case 3 and connected to a connector and such at the floor side.

The cable lead out portion 33 is arranged to project from the outer face of the peripheral wall 32 of the lower case 3A, and includes a plurality of groove portions (insertion holes) 33A for housing the flat cable 2 formed at its upper face 7B. The plurality of groove portions 33A is arranged to communicate between inside and outside of the lower case 3A, and is extending linearly along a slide direction of the slide rail. The flat cable 2 is passed through a predetermined one groove portion 33A of the plurality of groove portions 33A, by which the another end side of the flat cable 2 is wired from the inside to outside of the case 3. When winding the flat cable 2 to the inside of the case 3 or when leading out the flat cable 2 to the outside of the case 3, the flat cable 2 is guided along the groove portion 33A.

As shown in FIG. 2, the rotating table 4 is formed into a circular disc-like shape in entire shape and includes, at its center, a hole 4a for passing the central shaft 7 therethrough. An upper face of the rotating table 4 is provided with six rail portions 41 which are radially-arranged about the central shaft 7 as a center, and are configured to slide the roller 5 in a radial direction of the rotating table 4.

Figure 3:
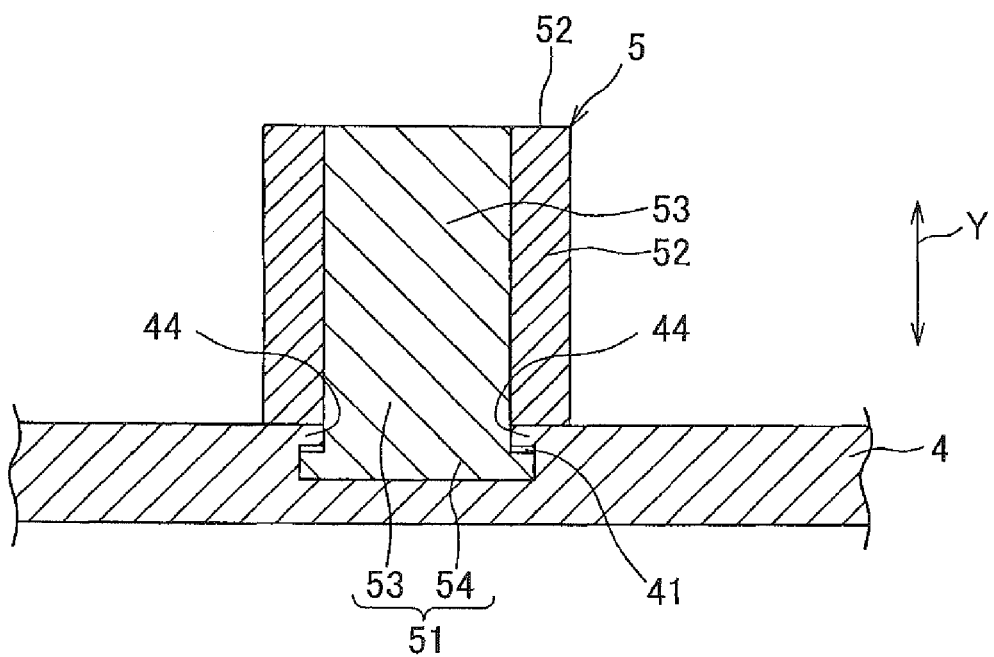
FIG. 3 is a cross-sectional view showing a state in which a roller constituting the flat cable winding device is pivotally-supported at a rotating table (i.e. rotating body)

As shown in FIGS. 2 and 3, each rail portion 41 is formed concave with respect to the upper face 7B of the rotation table 4, and includes an elongated hole 42 extending radially outward from the central shaft 7 side and a circular portion 43 provided at an end of the elongated hole 42 located radially-outward of the rotating table 4. The elongated hole 42 includes a pair of locking portions 44 for attaching the roller 5 to the rotating table 4. The pair of locking portions 44 is extending toward each other from upper ends in the widthwise direction of the elongated holes 42 and is formed throughout the entire longitudinal length of the elongated hole 42. The elongated hole 42 is formed such that the width of the space located lower than the pair of locking portions 44 is equal to the diameter dimension of the circular portion 43.

As shown in FIG. 2, each of the six rollers 5 includes a shaft portion 51 and a roller body 52, the roller body 52 being formed in a cylindrical shape and including, at its center, a hole portion 5a though which the shaft portion 1 is inserted. When the respective rollers 5 are slid toward the central shaft 7 while being slidably attached to the rotating table 4, the six rollers 5 are positioned so as to align along the circumferential direction of the rotating table 4. Three rollers 5 of the six rollers 5 correspond to reversing rollers 5A (shown in FIG. 1), and the reversing rollers 5A are arranged alternatively with the rollers 5 others than the reversing rollers 5A. The reversing rollers 5A reverse the another end side of the flat cable 2 wound around the central shaft 7.

As shown in FIG. 3, the shaft portion 51 includes a columnar shaft body 53 and a to-be-locked portion 54 extending in the outward direction from the shaft body 53, the to-be-locked portion 54 being configured to be locked at the locking portion 44 and having a diameter larger than a diameter of the shaft body 53. This to-be-locked portion 54 is provided at an end in the longitudinal direction (a height direction Y) of the shaft body 53, and a dimension in the radial direction of the to-be-locked portion 54 is formed equal with the diameter dimension of the circular portion 43. In addition, a dimension in the height direction Y of the to-be-locked portion 54 is formed smaller than a dimension in the height direction Y of the lower space of the elongated hole 42.

The spiral spring 6 is formed by spirally winding a wire metal having elasticity. An end of the spiral spring 6 adjacent to its center is passed through and fixed to the locking groove 72 of the central shaft 7, and an end of the spiral spring 6 at its outer periphery side is locked at a lower face of the rotating table 4, thereby biasing the rotating table 4 in the winding direction of the flat cable 2. That is, firstly, the rotating table 4 is rotated in a direction opposed to the winding direction for a predetermined times so that the spiral spring 6 stores the biasing force, and after that, the flat cable 2 reversed by the reversing roller 5A is wound around the outer circumferences of the plurality of rollers 5, 5A. By doing so, the rotating table 4 is biased in the winding direction by the restoring force of the spiral spring 6, and with this biasing force the flat cable 2 is wound by the central shaft 7 and the rotation table 4.

Next, a method for mounting the rollers 5 (the reversing roller 5A) to the rotating table 4 of the flat cable winding device 1 is explained. Firstly, the shaft portion 51 is brought closer to the rail portions 41 of the rotating table 4 with the to-be-locked portion 54 side ahead, and the to-be-locked portion 54 is overlapped to a lower face of the circular portion 43 and the to-be-locked portion 54 is slid toward the central shaft 7. In this manner, the pair of locking portions 44 enters between the shaft body 53 of the shaft portion 51 and the to-be-locked portion 54, thereby slidably attaching the shaft portion 51 to the rotating table 4 so as to be slidable in the radial direction of the rotating table 4. Then, by inserting the shaft portion 51 into the hole 5a of the roller body 52, the roller body 52 is rotatably mounted to the shaft portion 51.

Figure 4A:
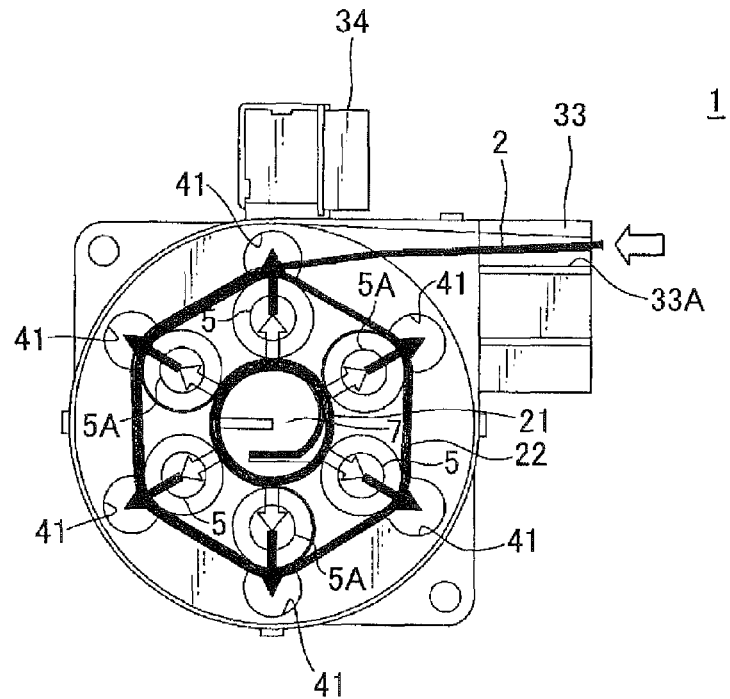
Figure 4B:
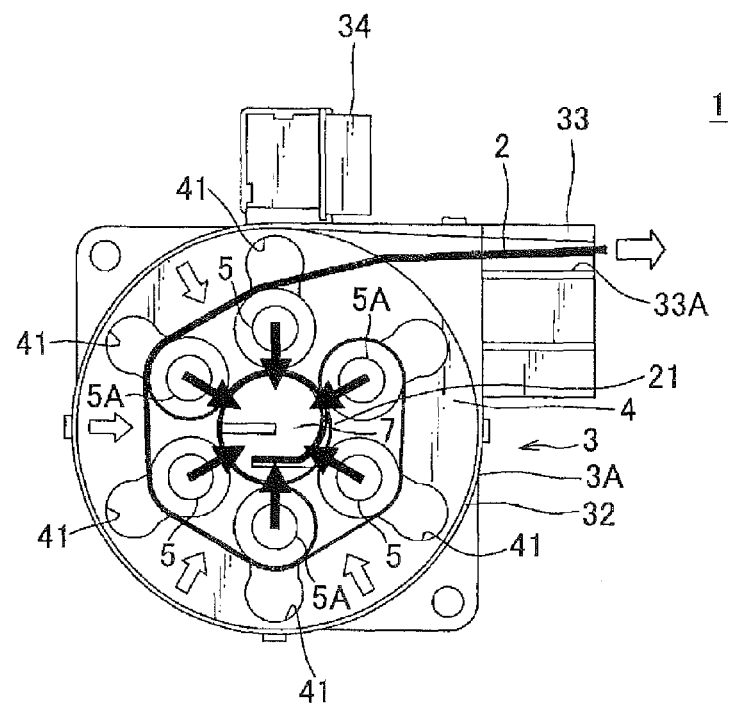
Figure 5:
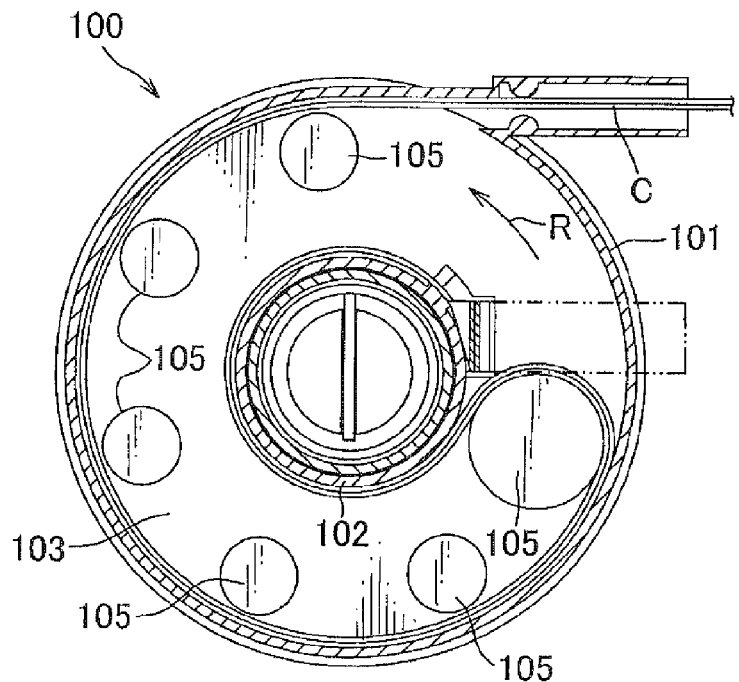
FIG. 5 is a plan view of a conventional flat cable winding device.
Figure 6A:
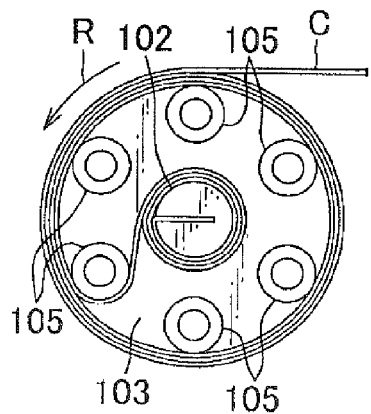
FIGS. 6A through 6C illustrate an operation of the flat cable winding device shown in FIG. 5.
Figure 6B:
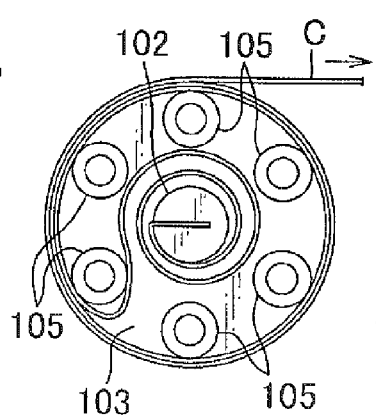
Figure 6C:
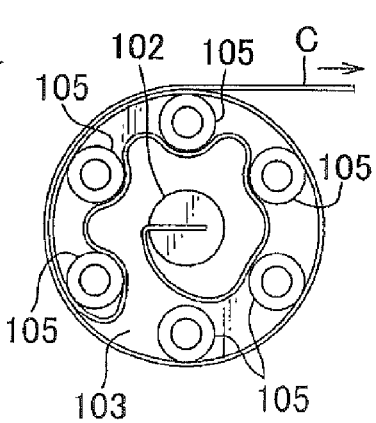

In the following, action of the flat cable 2 in the flat cable winding device 1 is explained in reference to FIGS. 4A, 4B. Firstly, the plurality of rollers 5, 5A is slid away from the central shaft 7 of the rotating table 4 so it is separated from the central shaft 7. One end sides of the plural pieces (three pieces, in this embodiment) of the flat cables 2 are overlapped together and locked at the slit 71, while the another end sides thereof are arranged independent one by one. Each flat cable 2 is wired along the winding direction of each reversing roller 5A, and then the another end sides of the flat cable 2 are reversed by the respective reversing rollers 5A and led out from the groove portion 33A to the outside of the case 3. In FIGS. 4A, 4B, the upper case 3B is omitted.

When the rotating table 4 is rotated in the winding direction by the restoring force of the spiral spring 6 as described above, the flat cables 2 are wound around the outer circumference of the central shaft 7 and the outer circumferences of the plurality of the rollers 5, 5A of the rotating table 4. This forms an inner winding portion 21 formed by the flat cables 2 wound along the outer circumference of the central shaft 7 and an outer winding portion 22 formed by the flat cables 2 wound along the outer circumferences of the plurality of the rollers 5, 5A. During this time, the reversing rollers 5A are slid toward the central shaft 7 by the winding force of the outer winding portion 22 and are pushed toward the inner winding portion 21. As shown in FIG. 4A, as the flat cables 2 are wound, a number of windings of the flat cable 2 to the central shaft 7 is increased, and the diameter dimension of the inner winding portion 21 is increased. Thus, the plurality of the rollers 5, 5A is pushed back toward the radially-outward side of the rotating table 4 by the inner winding portion 21 and slid radially-outward of the rotating table 4. The reversing roller 5A is rotated (rotated on its axis) while being pushed toward the inner winding portion 21, and delivers the flat cable 2 which is unwound from the central shaft 7 to the central shaft 7 side. In this manner, the flat cables 2 are wound up.

Referring to FIG. 4B, when the flat cables 2 are drawn out from the state in which the flat cables 2 are wound inside of the case 3 as described above, the rotating table 4 is rotated in the opposite direction of the winding direction, and the outer winding portion 22 is unwound and led out to the outside of the case 3. At the same time, the inner winding portion 21 is unwound, and the flat cables 2 are delivered to the outer winding portion 22 via the reversing rollers 5A, thereby leading out the flat cables 2. As the flat cables 2 are led out, the number of windings of the flat cable 2 to the central shaft 7 is decreased, and the diameter dimension of the inner winding portion 21 is reduced. Thus, the reversing rollers 5A are pushed toward the central shaft 7 by the winding force of the outer winding portion 22 and slid toward the central shaft 7. During this time, the reversing roller 5A is rotated (rotated on its axis) while being pushed toward the inner winding portion 21 by the outer winding portion 22, and delivers the flat cable 2 unwound from the central shaft 7 toward the outer circumferences of the plurality of rollers 5, 5A, thereby sequentially leading out the flat cable 2 to the outside of the case 3.

According to the embodiment explained above, the reversing roller 5A is configured to be slidable in the radial direction of the rotating table 4, and the reversing roller 5A is pushed toward the inner winding portion 21 by the outer winding portion 22. Thus, during the leading out of the flat cable 2, the reversing roller 5A, while being pushed toward the inner winding portion 21, is rotated with involving the flat cable 2, and the flat cable 2 unwound from the central shaft 7 is forcibly delivered toward the outer circumference of the reversing roller 5A. As a result, the chance of producing the slack of the flat cable at around the central shaft 7 (at the inner winding portion 21) is reduced, preventing the interference of the slackened flat cable 2 with the plurality of rollers 5 (the reversing roller 5A). Thus, the rotation of the rotating table 4 is not impeded, achieving smooth winding and leading out of the flat cable 2.

Furthermore, when retaining the one end side of the flat cable 2 to the central shaft 7, the plurality of the rollers 5 (reversing roller 5A) is slid away from the central shaft 7 of the rotating table 4 and the plurality of the rollers 5 is separated from the central shaft 7 to form a space around the central shaft 7. Thus, the flat cable 2 can be easily retained to the central shaft 7.

The aforementioned embodiment is only a representative embodiment of the present invention, and the present invention is not limited of this embodiment. That is, the present invention can be modified and performed in various ways without departing from the gist of the present invention.

For example, although the above-described embodiment shows the flat cable winding device used for an electric wire wiring device for sliding seat, a winding device according to the present invention may be used, not just for an electric wire wiring device for sliding seat, but for an electric wire wiring device for slide door, and may be used for a wiring device for wiring an electric wire at a rotatable opening/closing door or a bonnet. Furthermore, a winding device according to the present invention may be used, not just for a vehicle, but for a wiring device for wiring an electric wire across a movable part of an equipment or a device having various movable parts. Furthermore, although the above-described embodiment shows a winding device for winding a single flat cable for simplicity, the present invention may be used for a winding device for winding plurality of flat cables bundled together.

LIST OF REFERENCE SIGNS 1 flat cable winding device
2 flat cable
3 case
4 rotating table (rotating body)
5 roller
5A reversing roller
6 spiral spring (biasing element)
7 central shaft
21 inner winding portion
22 outer winding portion

The invention claimed is:

1. A flat cable winding device for winding one end side of a flat cable and leading out another end side of the flat cable, the flat cable winding device comprising:
   a case having an insertion hole through which the flat cable is inserted;
   a central shaft provided in the case and retaining the one end side of the flat cable;
   a rotating body configured to rotate about the central shaft; and
   a biasing element configured to bias the rotating body in a winding direction of the flat cable,
   wherein the rotating body includes a plurality of rollers arranged along a circumferential direction of the rotating body and configured to slide in a radial direction of the rotating body,
   wherein at least one of the plurality of rollers is a reversing roller configured to reverse the flat cable entered from the insertion hole of the case toward the central shaft, and
   wherein,
   when the rotating body which is biased by the biasing element is rotated in the winding direction and the flat cable is wound up so as to form an inner winding portion formed by the flat cable wound around the central shaft and an outer winding portion formed by the flat cable wound around outer circumferences of the plurality of rollers,
   the plurality of rollers is pushed toward the inner winding portion by the outer winding portion.

* * * * *